July 11, 1944.    F. X. LAMB    2,353,617
DAMPING DEVICE FOR ELECTRICAL INSTRUMENTS
Filed April 19, 1941    2 Sheets-Sheet 1
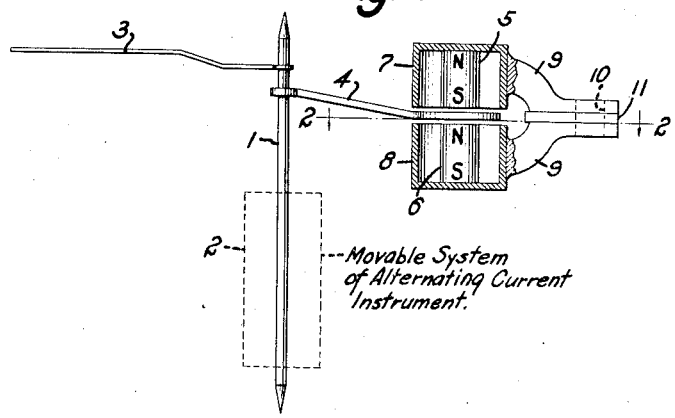
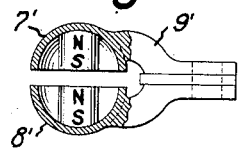
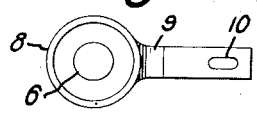
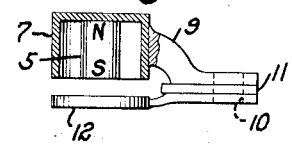
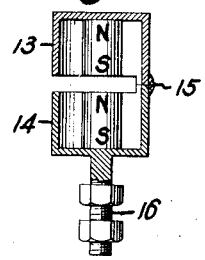
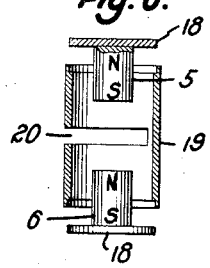
Inventor:
Francis X. Lamb,
By
Pierce & Scheffler,
Attorneys.

July 11, 1944.    F. X. LAMB    2,353,617
DAMPING DEVICE FOR ELECTRICAL INSTRUMENTS
Filed April 19, 1941    2 Sheets-Sheet 2
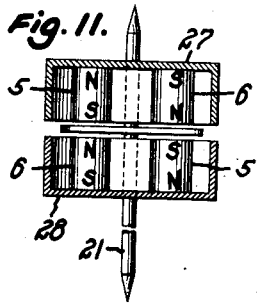
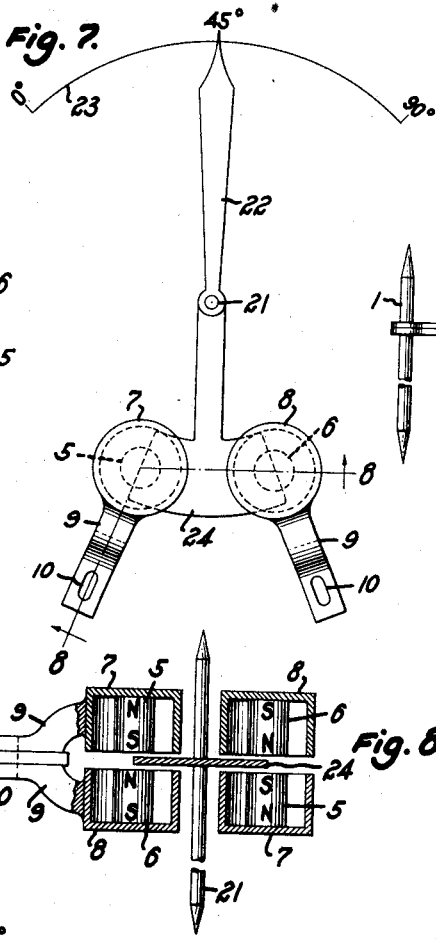
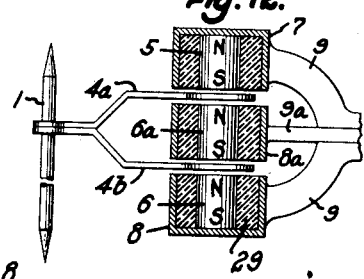
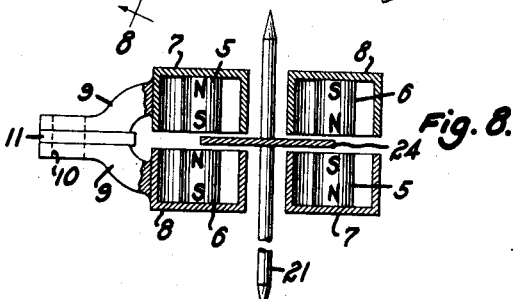
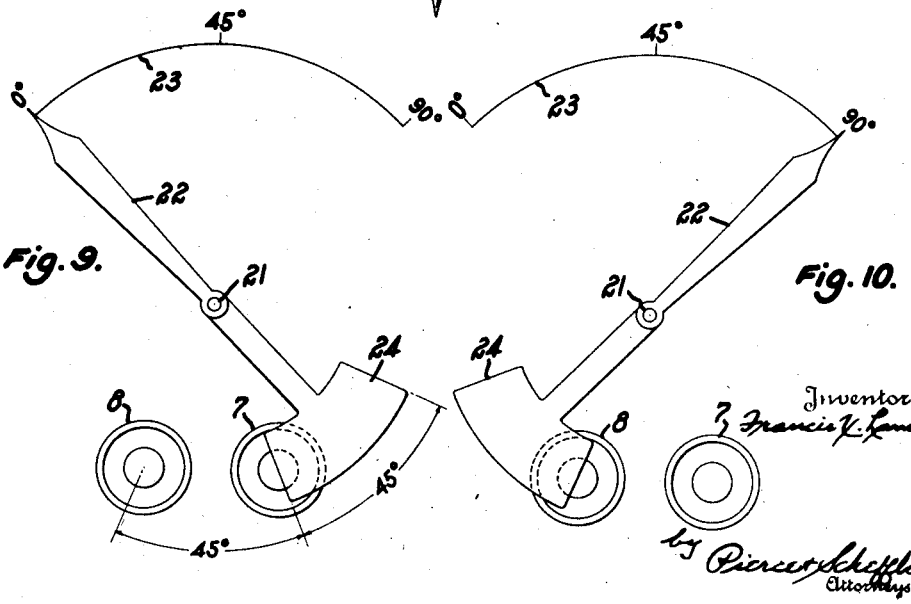
Inventor:
Francis X. Lamb,
by Pierce Scheffler
Attorneys.

Patented July 11, 1944

2,353,617

UNITED STATES PATENT OFFICE 2,353,617

DAMPING DEVICE FOR ELECTRICAL INSTRUMENTS

Francis X. Lamb, East Orange, N. J., assignor to Weston Electrical Instrument Corporation, Newark, N. J., a corporation of New Jersey Application April 19, 1941, Serial No. 389,447

17 Claims. (Cl. 171—34)

This invention relates to damping devices for electrical instruments, and more particularly to magnetic damping devices for use on alternating current instruments.

The problem of damping the deflection of the movable element of direct current instruments is fairly simple and has been solved by winding the movable coil upon a closed metallic frame. It is difficult, however, effectively to damp the movable element of alternating current instruments, and the methods now employed on instruments of the movable iron, electro-dynamometer, induction and other types impose certain limitations upon the size, the construction and the accuracy of the instrument.

A theoretical consideration of the problem would seem to indicate that magnetic damping devices could be used to advantage on alternating current instruments, but none of the previously suggested magnetic damping devices has been entirely satisfactory and, in general, the prior proposals have been open to the objections that they appreciably increased the weight upon the instrument pivots, increased the overall size of the instrument, and/or were not permanent and constant over long periods of use.

An object of this invention is to provide magnetic damping devices that avoid the several objectionable features of all prior magnetic damping systems. Other objects are to provide magnetic damping devices that are of small size and effectively shielded, whereby permanent and constant damping of the movable element of an alternating current instrument is achieved. Another object is to provide a magnetic damping system including a plurality of small damping magnets that may be adjusted with respect to a damping vane to obtain various degrees of damping or over-damping of the instrument movement. A further object is to provide magnetic damping devices that do not appreciably increase the weight of the movable element of the instrument, and which necessitate no increase in the overall dimensions of the instrument. More specifically, an object is to provide a magntic damping device including a pair of damping magnets disposed along a common axis and substantially completely shielded, and a thin metallic vane attached to the instrument movement and rotatable in the magnetic flux gap between the spaced unlike poles of the two magnets.

These and other objects and advantages of the invention will be apparent from the following specification when taken with the accompanying drawings in which:

Fig. 1 is a somewhat diagrammatic side elevation of an alternating current instrument movement provided with a magnetic damping device embodying the invention, the damping device being shown in substantial central vertical section;

Fig. 2 is a sectional view of the magnetic system as seen on the plane indicated by the line 2—2 of Fig. 1;

Figs. 3 to 5 inclusive are central vertical sections through other forms of damping magnet structures;

Fig. 6 is an exploded sectional view of another form of shielded magnet construction;

Figs. 7 and 8 are a schematic plan view and a vertical section, respectively, of an alternating current instrument that is uniformly damped over a range of 90° angular displacement, the vertical section being substantially on the plane of line 8—8 of Fig. 7;

Figs. 9 and 10 are schematic plan views showing alternative end positions of the instrument movement of Fig. 7;

Fig. 11 is a vertical section through a magnetic damping structure that includes a plurality of magnetic damping units within a single shielding shell; and Fig. 12 is a vertical section through a magnetic damping device in which a plurality of vanes move through axially spaced magnetic gaps.

In Fig. 1 of the drawings, the reference numeral 1 identifies the pivotally mounted staff which serves as a support and axis for the movable system 2 and pointer 3 of an alternating current instrument. The instrument movement may be of any desired type, depending upon the quantity to be measured or registered, as the magnetic damping devices are substantially completely shielded and therefore impose no restrictions upon the electrical or the mechanical design of the instrument movement.

A damping vane 4, usually of thin sheet aluminum, is firmly secured to the staff 1 in any desired manner and rotates in the magnetic flux gap or gaps of the magnetic system. The magnetic elements are not of the previously proopsed C-shape but are two small "bar" magnets 5, 6 that lie along a common axis and have adjacent unlike poles spaced apart to form a flux gap. Cup shaped shielding shells 7, 8, preferably of soft iron, are secured to and extend completely around the entire lengths of the magnets 5, 6, respectively. It is desirable, but not essential, that the shielding shells be coaxial with the associated magnets, and that the lateral clearance between the magnets and their shells be greater than the length of the flux gap between the magnets. The magnets are permanently secured to their shielding shells by cementing, welding or, as will be described later, by a molded plastic in the annular space between the magnet and its shell.

Each shielding shell has an integral or attached bracket arm 9 for supporting the magnetic system upon a fixed part, not shown, of the instrument or the instrument casing. The bracket arms preferably have elongated slots 10 to permit adjustment of the magnetic system radially of the damping vane 4, and shims or spacing members 11 may be inserted between the bracket arms 9 to adjust the length of the flux path between the magnets 5, 6 and the soft iron shells 7, 8.

The shims 11 and the bracket arms 9, when not integral with the shells, may be made either of magnetic or non-magnetic material depending upon the desired path of the return flux of the bar magnets. When the bracket arms and shims are of non-magnetic material, the reluctance of the solid material path connecting the shells 7, 8 is relatively high and the effective flux path includes the gap between the magnets 5, 6 and the gap between the rims of the shells 7, 8. When the bracket arms and shims are of magnetic material, the return flux path of magnets 5, 6 is through the brackets and shims, and there is substantially no magnetic flux between the rims of the magnetic shells 7, 8.

The small size of the magnetic damping system is indicated by the following data as to one practical embodiment that is typical of the invention. The magnets 5, 6 were of "Alnico," a permanent magnet material of high coercive force, and had a diameter of 0.3 inch, a length of 0.4 inch, and the magnets and their shield shells were spaced apart by 0.050 inch. The soft iron shielding shells 7, 8 had a radial thickness of approximately 0.025 inch, and the damping vane 4 was an aluminum sheet approximately 0.010 inch in thickness. This damping system afforded at least critical damping of an ordinary movable iron type instrument.

As shown in Fig. 3, the magnets 5, 6 may be secured to and enclosed by hemispherical shells 7', 8', respectively, of soft iron that have integral extensions 9' forming supporting arms for the damping magnet system and a low reluctance return path for the flux traversing the gap between the magnets.

As shown in Fig. 4, a single bar magnet 5 and its shielding shell 7 of ferromagnetic material may have a flux path through a soft iron plate 12 that is spaced axially from the magnet 5. The damping vane, not shown, moves in the serially arranged magnet flux gaps between the plate 12 and, respectively, the magnet 5 and the shell 7. The total length of the gaps may be adjusted by a non-magnetic shim 11 of desired thickness between the non-magnetic bracket arm 9 and the plate 12, and an elongated slot 10 through these elements permits adjustment of the magnetic system radially of the damping vanes.

Another construction, as shown in Fig. 5, comprises small bar magnets 5, 6 within and attached to soft iron shells 13, 14 that have arcuate extensions in magnetic contact to form a low reluctance return path for the magnetic flux traversing the gap between the magnets, the extensions being connected by weld metal 15 to form a rigid structure. The magnetic assembly may be supported by any desired means, for example by a mounting screw 16 that is integral with or attached to one of the shells.

A magnetically equivalent embodiment, as shown in Fig. 6, comprises magnets 5, 6 secured to soft iron caps 18 that may be force fitted into the counterbored ends of a soft iron tube 19. The tube has a circumferential slot 20 at the central portion thereof to provide a damping vane opening in transverse alinement with the gap between the magnets 5, 6. The mounting means may be of the bracket type shown in Fig. 1 or of the screw and nut type shown in Fig. 5.

It is to be noted that the low reluctance return path inherent in the constructions of Figs. 5 and 6 reduces to a minimum the stray flux that may adversely influence other elements of the instrument in which the magnetic damping system is incorporated, and affords a correspondingly high protection of the magnets 5, 6 from external fields. The magnetic flux across the gap between magnets 5, 6 is a maximum when the return flux path is magnetic but, with non-magnetic brackets and shims in the Fig. 1 construction, the decrease in the flux between the magnets is offset by the increased damping effect of the flux between the rims of the shells 7, 8. The stray flux is increased somewhat when the brackets 9 and shims 11 of Fig. 1 are non-magnetic but the protection of other instrument elements and of the magnets is substantial and sufficient in many applications of the magnetic damping systems.

The embodiment shown in Figs. 7 to 10, inclusive, eliminates certain difficulties encountered with prior magnetic damping systems for instrument movements having a pointer deflection of 90°. Such prior systems included a damping vane of an angular length of 90° and required an unobstructed space of 180° within the instrument. The damping vane of 90° spread imposed a relatively heavy load upon the bearings of the moving system, a vane of that angular length was difficult to manufacture and assemble without becoming warped or bent, and even a slight tilting of the instrument staff or of the parts cooperating with the vane would result in a mechanical contact of the parts. These difficulties, and those due to the mechanical vibration of a large damping vane, are eliminated or reduced by employing a plurality of angularly spaced magnetic damping units and a vane of correspondingly reduced angular length.

As shown in Figs. 7 to 10, the instrument staff 21 has an angular movement of 90° and carries a pointer 22 that is movable along an arcuate scale 23, of 90° extent, that is graduated in any desired values. The staff also carries a vane 24 that moves through the flux gaps of a plurality of circumferentially spaced magnetic damping units, the vane having an angular length equal to the angular scale length divided by the number of damping units. In the illustrated example, there are two magnetic damping units spaced circumferentially by 45°, and the damping vane has an angular length of 45°. Each damping unit may be of any of the above described constructions and, as illustrated, is of the general type shown in Fig. 1; the several parts of the magnetic damping units being identified by the reference numerals applied to Fig. 1. It is to be noted that the magnetic poles of the damping units are reversely arranged to neutralize the small magnetic leakage from the substantially completely shielded magnetic systems.

The substantially uniform magnetic damping of the instrument movement by a vane having a short angular length, equal to the angular scale length divided by the number of damping units, will be apparent from a consideration of Figs. 7, 9 and 10. At the midposition of the instrument pointer 22, the damping vane 24 lies within a portion of the magnetic flux paths of the respective magnetic damping devices, as shown in Fig. 7. At zero position of the pointer 22, as shown in Fig. 9, the damping vane 24 moves within the flux gap or gaps of only one damping unit and, as shown in Fig. 10, the vane 24 moves within the flux gap or gaps of the other damping unit when the pointer 22 is at the other limit of the angular movement of the moving system. Through approximately 40° of travel of the pointer 22 from zero position, the damping vane 24 moves in the flux gap or gaps of only the right hand damping unit. The damping vane then enters the flux gap or gaps of the other magnetic damping unit as the pointer approaches its central position but the vane 24 simultaneously moves out of the flux gap or gaps of the first damping unit. During displacement of the pointer 22 in the upper half of its range of movement, the vane moves in the flux gap or gaps of only the second or left hand damping unit, see Fig. 10. The instrument movement is thus substantially uniformly damped by a magnetic vane of short angular length.

As shown in Fig. 11, the dual damping units may be replaced by a unitary construction in which two sets of reversely arranged pairs of permanent magnets 5, 6 are secured to and within a single pair of soft iron shells 27, 28. The major part of the magnetic flux follows a circular path through the magnets and only a small flux traverses the air gap between the soft iron shells. Magnetic leakage is thus reduced to a minimum and the magnets are effectively shielded from external fields.

A series of miniature bar magnets 5, 6, 6a may be axially alined, with unlike poles adjacent each other to provide a multiplicity of flux gap paths in which the axially spaced damping vanes 4a, 4b are movable. The magnets 5, 6 are mounted within shielding shells 7, 8, respectively, of soft iron, and the intermediate magnet 6a is surrounded by a soft iron shell 8a. The several bar magnets are supported within their respective soft iron shells by a molded insulating sleeve 29 of rubber or a synthetic resin. The shells 7, 8 have integral or attached bracket arm 9, as previously described, and the shell 8a has a mounting arm 9a that fits between the mounting arms 9, 9.

The magnetic damping systems as shown in Figs. 7 to 10, inclusive, form the subject matter of my copending application Serial No. 432,139, filed February 24, 1942.

It is to be understood that the invention is not limited to the specific constructions herein shown and described, and that various changes may be made in the several parts, their relative sizes, shapes and arrangements without departure from the spirit of my invention as set forth in the following claims.

I claim:

1. Damping apparatus for the moving system of a measuring instrument, said apparatus comprising a bar magnet, shield means of magnetic material including a shell portion extending completely around and in radially spaced relation to the entire length of said bar magnet and an end portion extending across and in magnetic contact with an end of said bar magnet, and magnetic material means spaced axially from the other end of said bar magnet by a flux gap in a series magnetic circuit including said shield means, and a damping vane movable in said flux gap and secured to the moving system of the instrument.

2. Damping apparatus as claimed in claim 1, wherein said magnetic material means comprises a second bar magnet within a shielding shell of ferromagnetic material, said bar magnets having unlike poles adjacent to and spaced from each other by said gap.

3. Damping apparatus as claimed in claim 1, in combination with means including non-magnetic bracket means securing said shield means to said magnetic material means forming a solid material path of high reluctance connecting said shield means and said magnetic material means, whereby the return flux of said bar magnet traverses the gap between said shield means and said magnetic material means.

4. Damping apparatus as claimed in claim 1, wherein said magnetic material means comprises a second bar magnet within a shielding shell of ferromagnetic material, said bar magnets having unlike poles adjacent to and spaced from each other by said gap, in combination with magnetic bracket means securing said shield means to said magnetic material means, thereby to provide a low reluctance flux return path between the same.

5. Damping apparatus as claimed in claim 1, wherein said magnetic material means comprises a soft iron plate.

6. Damping apparatus for an instrument movement carrying a damping vane, said apparatus comprising axially alined bar magnets with unlike poles spaced from each other to provide a flux gap in which the damping vane is movable, and shield means substantially completely enclosing and radially spaced from said bar magnets, said shield means having an opening in transverse alinement with the flux gap between said magnets and being in magnetic contact with the outer ends of said magnets to provide a return flux path for the magnetic flux traversing the gap between said magnets.

7. Damping apparatus as claimed in claim 6, wherein said shield means includes material of low reluctance extending between the portions of said shield means at opposite sides of said opening, to provide a low reluctance return path in shunt with the opening in said shield means or the flux traversing the gap between said bar magnets.

8. In damping apparatus for a measuring instrument having a rotatable staff carrying a damping vane, a pair of axially alined bar magnets with unlike poles spaced from each other to provide a flux gap in which the damping vane is movable, shield means substantially completely enclosing and radially spaced from said bar magnets, said shield means comprising axially alined shells of magnetic material secured to and surrounding the respective magnets, said shells having their outer ends connected magnetically to the adjacent ends of the bar magnets and being spaced apart along at least a part of their adjacent alined edges to leave an opening in transverse alinement with the flux gap between said magnets, and means securing said shells to each other.

9. In damping apparatus, the invention as claimed in claim 8, wherein said shells are spaced apart along their entire adjacent alined edges, and said securing means is of magnetic material, thereby providing a return path of low reluctance for the flux traversing the gap between said bar magnets.

10. In a damping apparatus for a measuring instrument having a rotatable instrument staff carrying a damping vane, a magnetic damping system associated with said vane and comprising a pair of axially alined bar magnets with unlike poles spaced from each other to provide a flux gap in which the damping vane is movable, a tubular body of magnetic material enclosing and radially spaced from said magnets, and magnetic material connecting the outer ends of the bar magnets to the respective adjacent ends of the tubular body, said tubular body having a circumferential slot in transverse alinement with the flux gap between said bar magnets.

11. In a damping device for an instrument movement, the combination with an instrument staff carrying a damping vane, of a magnetic damping unit comprising a miniature bar magnet, a shell substantially completely enclosing said magnet and connected mechanically and magnetically to one end of the same, magnetic material means spaced from the other end of said magnet and the shell to form therewith a series magnetic circuit, and brackets secured to said shell and said magnetic material means for mounting the same upon a support, said brackets including means for adjusting the magnetic damping unit radially of the damping vane.

12. A magnetic damping device for cooperation with a damping vane carried by an instrument movement, said device comprising a miniature bar magnet, a shielding shell of ferromagnetic material surrounding said magnet and connected magnetically to one end thereof, and magnetic means axially spaced from the other end of said magnet to provide a gap within which the damping vane is movable.

13. A magnetic damping device as claimed in claim 12, wherein said magnetic means comprises a second bar magnet within a cup-shaped shell of ferromagnetic material, the adjacent poles of said bar magnets being of opposite polarity and defining the gap in which said damping vane is movable.

14. A magnetic damping device as claimed in claim 12, wherein said magnetic means comprises a soft iron plate.

15. A magnetic damping device as claimed in claim 12, in combination with securing means of low reluctance securing said shell to said magnetic material means.

16. A magnetic damping device as claimed in claim 12, in combination with securing means of high reluctance securing said shell to said magnetic material means.

17. A magnetic damping device for cooperation with a damping vane carried by an instrument movement, said device comprising a miniature bar magnet, a shielding shell of material of low magnetic reluctance surrounding said magnet and connected magnetically thereto, magnetic means spaced axially from said magnet and said shell to provide a gap within which said vane is movable, and means including material of high reluctance mechanically connecting said magnetic means to said magnet and shell, whereby the return flux circuit for said magnet includes the gap between said magnetic means and said shell.

FRANCIS X. LAMB.